E. H. & C. J. Merrill,
Making Stone-Ware.
N° 5,206.   Patented July 31, 1847.
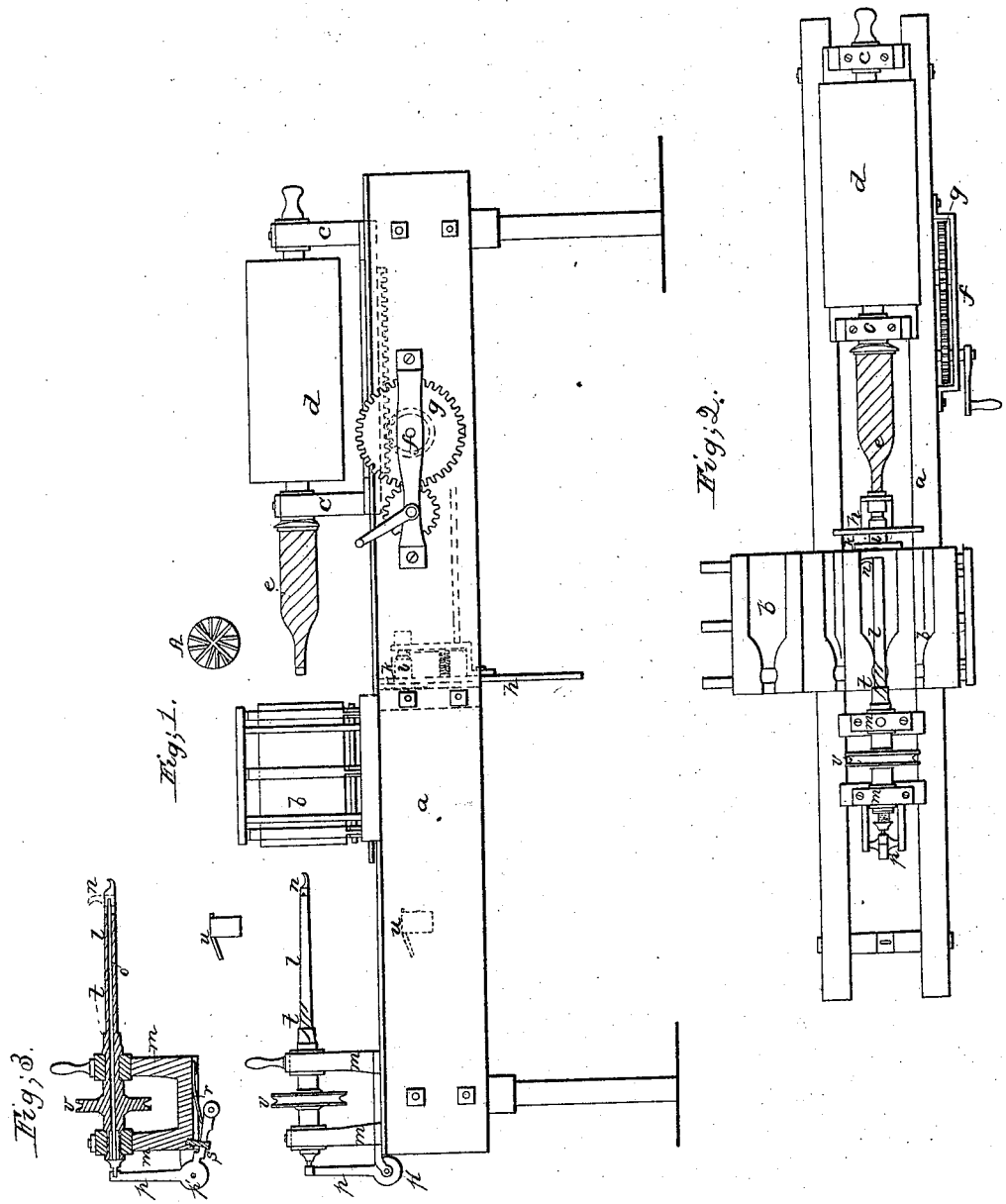

UNITED STATES PATENT OFFICE.

EDWIN H. MERRILL AND C. J. MERRILL, OF AKRON, OHIO.

IMPROVEMENT IN MAKING BOTTLES, &c., OF CLAY.

Specification forming part of Letters Patent No. 5,206, dated July 31, 1847.

*To all whom it may concern:*

Be it known that we, EDWIN H. MERRILL and C. J. MERRILL, of Akron, in the county of Summit and State of Ohio, have invented new and useful Improvements in Machinery for the Manufacture of Bottles and other Utensils from Clay or other Similar Material; and we do hereby declare that the following is a full, clear, and exact description of the principle or character which distinguishes it from all other things before known, and of the manner of making, constructing, and using the same, reference being had to the accompanying drawings, making part of this specification, in which—

Figure 1 is a side elevation of the machine; Fig. 2, a top plan, and Fig. 3 the mandrel detached in section.

The same letters indicate like parts in all the figures.

Many attempts have been heretofore made to manufacture hollow stoneware by machinery, but without success. The difficulty of pressing into shape and the forms of many articles—such as jugs and bottles—have precluded its employment generally. It has been essayed to form articles where they were of conical shape by means of a revolving piston working into the mold, the sides of the mold being made of porous material to absorb the water, for it was necessary to make the clay used very soft before it could be worked by these means. By our improvements we obviate all these difficulties and are enabled to manufacture any article either cylindrical or of other form, such as bottles, water-pipe, &c.

The nature of our invention consists in forming the clay in a mold by means of a revolving piston, on which are spiral channels to draw the clay back as the piston enters the mold, and in such articles as bottles, &c., the inserting the bottoms after the other parts have been made.

To construct our machine for making bottles, which is the one represented in the drawings, we place a mold near the center of a frame $a$, consisting of two side pieces supported by suitable legs and cross-ties. This mold $b$ may be made of cast-iron or other suitable material and so constructed as to open into four (more or less) parts or sections, so as to release the article when made readily. On a line with the center of this mold there is a mandrel supported on proper puppet-heads $c$, that slide between ways attached to the sides of the frame. Between the puppet-heads there is a long pulley $d$, on which a belt plays that communicates motion from the driving-power, and on the extreme end of the mandrel there is a core $e$, which is of the shape of the interior of the bottle to be made. This core has a series of spiral grooves around it, as shown in the figures, which are essential to the working of the machine, as without them the core could not be forced into the mold if the clay is of a consistency sufficiently stiff for the purpose. The puppet-heads are connected together, as is usual in lathes, and are made to slide forward by a rack underneath, (shown only in dotted lines in Fig. 1,) into which a pinion works on a shaft $f$. This shaft bears outside the frame in a gear-wheel $g$, into which a pinion of the crank-shaft works that is turned by hand to run the core out and in the mold. The clay is placed in the mold when closed and clamped, and is then spread and formed by the revolving core inserted for that purpose. After the core is withdrawn a sliding frame $h$, which slides up and down in the main frame $a$ at right angles to the puppet-heads, is raised. In this are the journals of a short mandrel $i$, bearing on its end next to the mold a flat circular disk $k$, in the face of which radial channels may be cut, as shown at A, Fig. 1. This disk is just the size of the bottom of the bottle and serves to affix a bottom to the large open end left by the core. To insert the bottom properly it is necessary to sustain and mold it on the inside. To do this there is a mandrel $l$ in sliding puppet-heads $m$, placed on sliding ways in the frame on the side of the mold opposite the neck of the bottle, there being a hole through the molds there of sufficient size to admit said mandrel into it. The mandrel projects beyond the puppet-heads a sufficient distance to reach the bottom of the bottle when inserted. To this end is jointed a short arm $n$, the length of which is the semi-diameter of the bottle. The mandrel is made hollow, and through its center a rod $o$ runs, (see Fig. 3,) one end of which is jointed to the said arm $n$. The other extends out through the end of the mandrel and is connected with the end of the vertical arm of a bent lever $p$, the fulcrum $p'$ of which is affixed to the puppet-heads and moves with them. The horizontal arm of said lever runs under the said puppet-heads and is borne down by a strong spring r. A set-screw s, that passes through this arm into the puppet-head, regulates the distance of its vibration, and with the spring causes the arm n to stand out straight in a line with the shaft, as shown in Fig. 3. When the mandrel is made to slide up into the neck of the bottle till the enlarged part t enters the neck, it turns out the neck for the cork, the spiral groove that is cut thereon serving to hold up the neck, which would otherwise be liable to start off from the mold and sink in. The other enlargement fills the space of the hole through the mold nearly, and is also threaded for the same purpose when the mandrel is inserted some distance into the bottle, with the short arm n straight, till the horizontal arm of the bent lever strikes the inclined plane in the stationary frame. (Shown at u in Fig. 1 in dotted lines.) This raises the end of the bent lever, draws back the vertical arm and rod o, which bends the short arm n at right angles. This position of the machine is shown in Fig. 2. The mold is open; but the two mandrels for forming the bottoms are in place for that purpose, the outside one i coupled with the core by which it is turned and the inside one turned by a pulley v thereon connected by a band with the driving-power, and both turning in the same direction. By this device the bottoms are firmly and evenly made and affixed to the other part. The inner mandrel is then withdrawn, the short arm on the end again resuming its position in a line with the mandrel as soon as the lever p passes off of the plane u. The mold is then opened, as represented in Fig. 2, and the perfect bottle is removed.

Having thus fully described our invention, what we claim therein as new, and desire to secure by Letters Patent, is—

1. The employment of a core or mandrel of the form of the interior of the article to be made and having spiral channels cut in its surface, substantially in the manner and for the purpose described.

2. In forming bottles or other similar articles of clay, the adding the bottoms thereof after the other parts have been formed, as above specified.

3. An interior mandrel having a radial arm jointed thereto, in the manner described, for forming the bottoms of bottles and other similar articles, and in combination therewith the exterior disk, all arranged and constructed substantially as before made known, not confining ourselves to the precise modification herein described, but suiting our arrangements to the articles to be manufactured.

EDWIN H. MERRILL.
C. J. MERRILL.

Witnesses:
G. T. McCURDY,
ABRAHAM BEARD.